United States Patent [19]
Wolford et al.

[11] Patent Number: 5,657,785
[45] Date of Patent: Aug. 19, 1997

[54] METHOD OF REPLACING VALVE PACKING

[75] Inventors: Larry L. Wolford, Long Beach; Brian K. Prince, Riverside, both of Calif.

[73] Assignee: Atlantic Richfield Company, Los Angeles, Calif.

[21] Appl. No.: 568,261

[22] Filed: Dec. 6, 1995

[51] Int. Cl.⁶ .................................................. F16K 41/04
[52] U.S. Cl. ....................... 137/15; 251/214; 277/59; 277/106; 277/124
[58] Field of Search ............................. 137/15; 251/214; 277/59, 106, 124

[56] References Cited

U.S. PATENT DOCUMENTS

| | | | |
|---|---|---|---|
| 4,886,241 | 12/1989 | Davis et al. ........................... | 251/214 |
| 5,056,757 | 10/1991 | Wood ..................................... | 251/214 |
| 5,129,625 | 7/1992 | Wood et al. ........................... | 251/214 |

*Primary Examiner*—Gerald A. Michalsky
*Attorney, Agent, or Firm*—Kyle L. Elliott

[57] ABSTRACT

A turbine fuel valve packing assembly including two sets of packing rings in which at least one packing ring is a V-shaped packing ring, a compression member, lantern ring, and packing gland with a sealing ring is disclosed which effectively seals turbine fuel valves against leaking. Further disclosed is a valve packing replacement method utilizing a bifurcated valve shaft allowing part of the shaft to be removed, thereby providing enough space for the valve packing assembly to be removed from the fuel valve and replaced without disassembling the entire fuel valve.

9 Claims, 4 Drawing Sheets

METHOD OF REPLACING VALVE PACKING

BACKGROUND OF THE INVENTION

This invention relates to valves, valve packing, and methods of valve packing replacement for turbines.

Gas turbines utilize a plurality of valves to control the amount of fuel being burned by the turbine. These valves must be packed to seal against fuel leaks. Because of the environmental regulations presently applicable to these valves, any leak through the packing of the valve must be repaired.

A typical valve comprises a valve shaft which extends through a stuffing box which houses the packing for the valve. One end of the valve shaft is external to the valve and is operated on by an actuator while the other end of the valve shaft is internal to the valve and operates to open and close the valve. The packing for the valve typically includes a compression member, usually a coiled spring with an aperture therethrough large enough to receive the valve shaft. The spring is placed in the stuffing box toward the internal end of the valve shaft. Thus, the valve shaft extends through the aperture of the compression member, and the compression member is inserted into the stuffing box toward the valve end of the valve shaft. Following the spring, three TEFLON® packing rings are placed over the valve shaft and pushed up into the stuffing box. Next, a conventional lantern ring with a central aperture is placed over the valve shaft and inserted up into the stuffing box. Finally, a packing gland having a centrally located aperture is placed over the valve shaft. The packing gland has a flange extending radially outward from the valve shaft for attachment to the valve and a flange extending axially into the stuffing box, so that when the packing gland is attached to the valve case, the spring is compressed thereby compressing the packing rings and expanding the packing rings radially outward and radially inward to create a seal between the valve shaft and the stuffing box wall. This packing assembly allows the valve shaft to translate longitudinally through the stuffing box and is designed to prevent fuel leaks. A sealing ring is provided between the lantern ring and the packing gland to prevent external contaminants from being introduced into the stuffing box and damaging the packing.

The turbine fuel valves operate at temperatures around 300° F. and pressures ranging from 120 psig. to 330 psig. Under these conditions the valve packing described has failed frequently creating environmental compliance problems.

Because the cabinet in which the valves are housed does not provide enough space for the valve shaft to be pulled far enough out of the valve to remove the valve packing assembly from the stuffing box, it is necessary to dismantle the valve to repair the valve packing. Thus, the valve must be bypassed and completely disassembled to remove the packing rings and the sealing ring. Because the valves must be bypassed and completely dismantled, the repair takes approximately 12–16 hours. Further, because the sealing ring is interposed directly between the packing gland and lantern ring, it is in direct contact with the stuffing box wall, and thus, it must be scraped off the stuffing box wall before the new packing is placed into the stuffing box. Again because the cabinet in which the valves are housed provides limited work space, this is a time consuming and difficult task. Therefore, valve packing assembly repair is time consuming and costly.

The time required to complete valve packing changes increases the cost of running the turbine. Further, the frequency with which the valve packing is repaired adds to the cost of running the turbine. It is desirable, therefore, to reduce the amount of time necessary to repair the valve packing and to reduce the frequency with which the valve packing fails.

BRIEF SUMMARY OF THE INVENTION

In accordance with the present invention there is provided a novel valve packing assembly located in a stuffing box of a turbine fuel valve. The valve packing assembly seals the valve from atmosphere and comprises a compression member, a first set of packing rings, a lantern ring, and a second set of packing rings.

In a preferred embodiment of the valve packing assembly, a packing gland is used to hold the lantern ring and the two sets of packing rings inside the stuffing box. The packing gland also defines a counterbore which holds a sealing ring against the valve shaft to seal the stuffing box from external contaminants. Each set of packing rings comprises three packing rings that are V-shaped. The packing rings are fabricated from TEFLON® impregnated with graphite.

The preferred embodiment of the assembly further includes a crosshead defining a shaft receiving area with a stub shaft receiving side and a valve shaft receiving side. A valve shaft is inserted into the valve shaft receiving side of the shaft receiving area and a stub shaft is inserted into the stub shaft receiving side of the shaft receiving area, so that the two shafts abut each other. The shaft receiving area is defined between two legs of the crosshead and are held between the two legs of the crosshead with pins. The shafts are further held securely in the crosshead by a tightening mechanism which pinches the two shafts between the legs of the crosshead.

There is further provided in the present invention a valve packing method and valve packing replacement method to replace packing located in a stuffing box for sealing a fuel valve of a turbine comprising placing a compression member over the valve shaft and into the stuffing box, placing a first set of packing rings into the stuffing box followed by a lantern ring, and placing a second set of packing rings into the stuffing box. After the second set of packing rings is inserted into the stuffing box, a packing gland is placed over the valve shaft and attached to the valve to compress the first and second sets of packing with the compression member. Thus, the packing rings expand outwardly and inwardly to seal the valve. To change the packing, the stub shaft is disconnected and removed from the crosshead and the valve shaft is slid in a direction out of the valve to remove the packing assembly from the stuffing box. The valve packing assembly is removed from the shaft and replaced. The crosshead is then reattached to the valve shaft and the stub shaft reattached to the crosshead. The sealing ring may also be changed during this process. In a preferred embodiment of the method, at least one of the packing rings has a V-shape and is fabricated from graphite impregnated TEFLON®.

These and other features and advantages of the present invention will appear from the following Detailed Description and the accompanying drawings in which similar reference characters denote similar elements throughout the several views.

DETAILED DESCRIPTION

Figure 1:
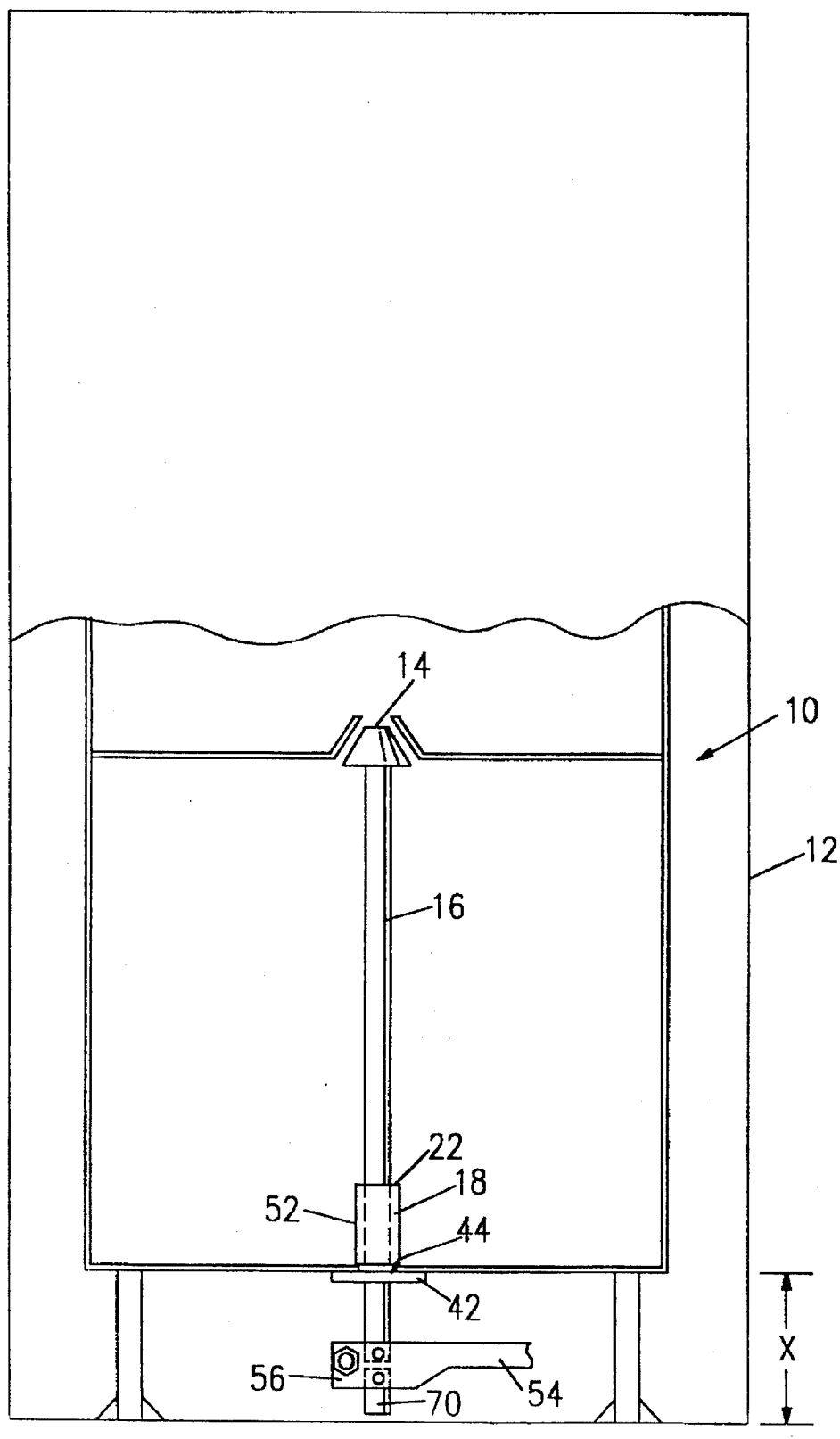
FIG. 1 is a schematic view of a turbine fuel valve and a cabinet housing the valve.

FIG. 1 schematically shows a steam turbine fuel valve, generally designated 10, contained in a valve cabinet 12. The valve comprises an inlet opening 14 and outlet opening (not shown). To open and close the inlet opening, a valve shaft 16 extends in one direction through a cylindrical stuffing box 18 and through the valve to the inlet opening. The valve shaft extends in the other direction out of the valve to an actuator (not shown). The actuator translates the valve shaft longitudinally to open and close the inlet opening. The valve shaft is allowed to translate longitudinally through the contents (i.e. the packing assembly) of the stuffing box which act to seal the valve from atmosphere preventing the escape of fuel from the valve.

Figure 2:
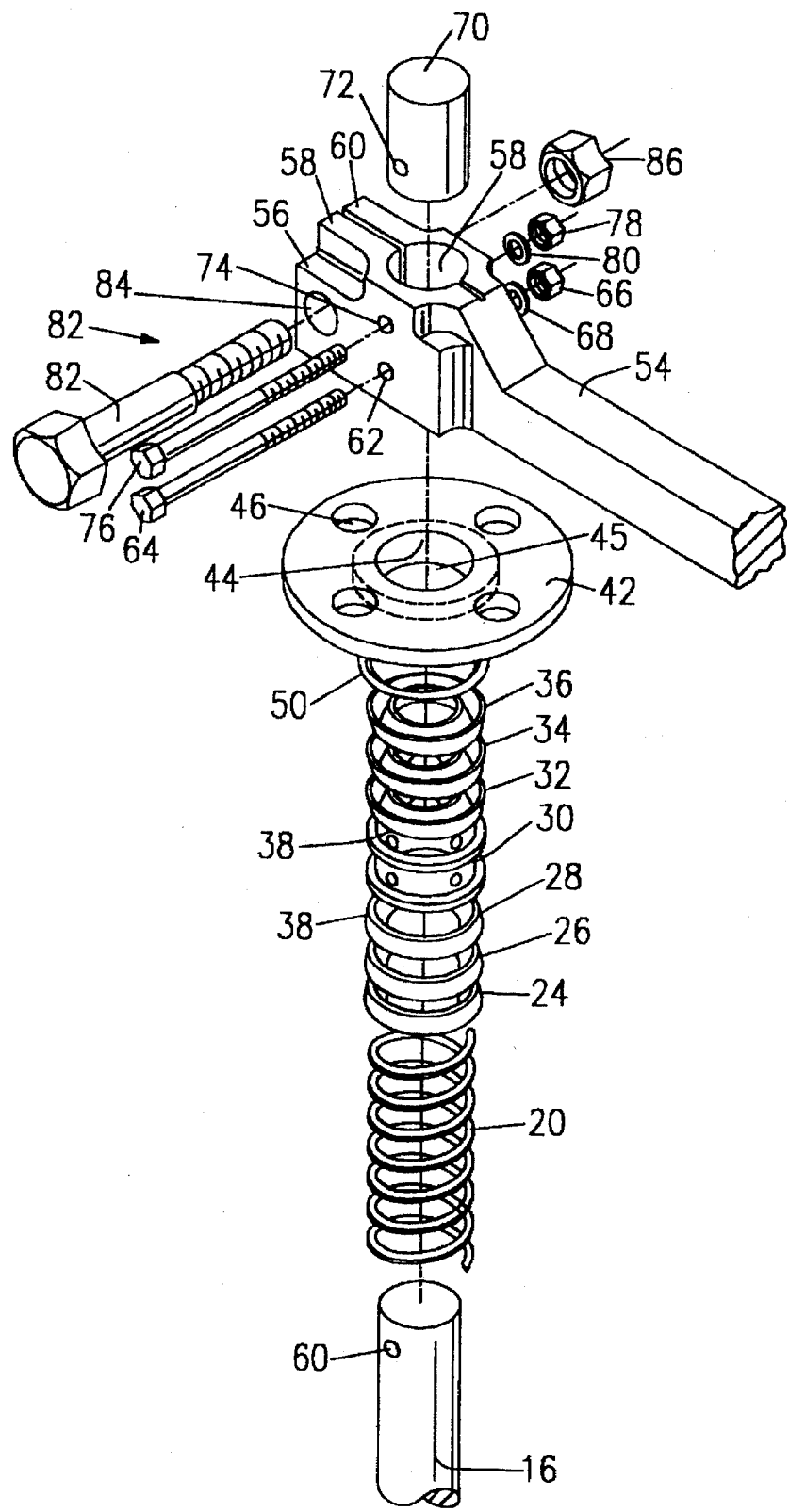
FIG. 2 is an exploded perspective view, inverted for clarity, of the valve packing assembly and shafts according to the present invention.
Figure 3:
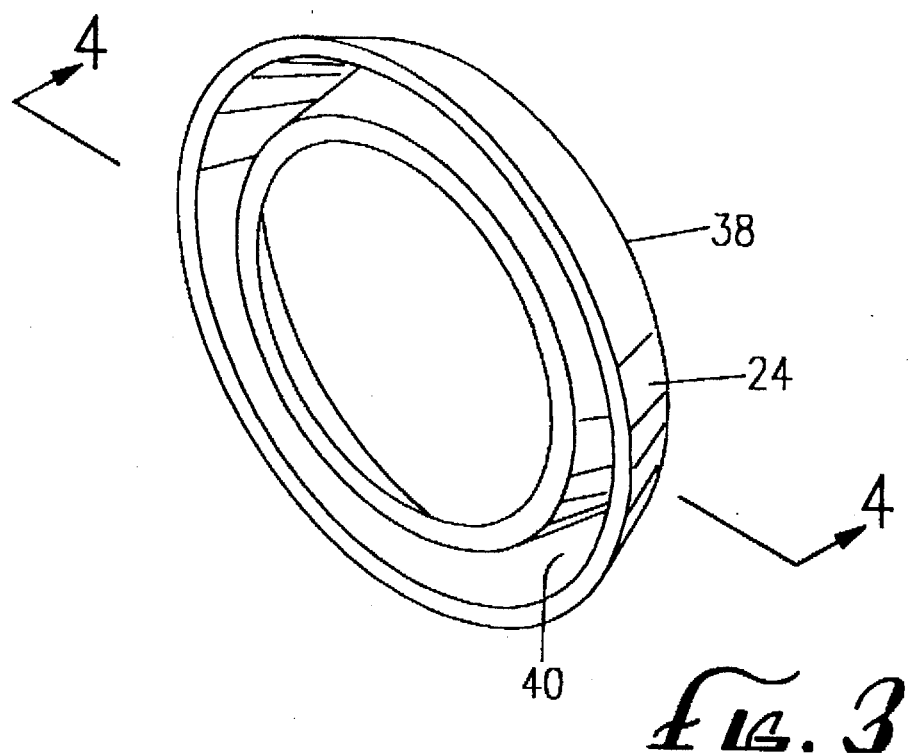
FIG. 3 is a perspective view of a generally V-shaped ring.
Figure 4:
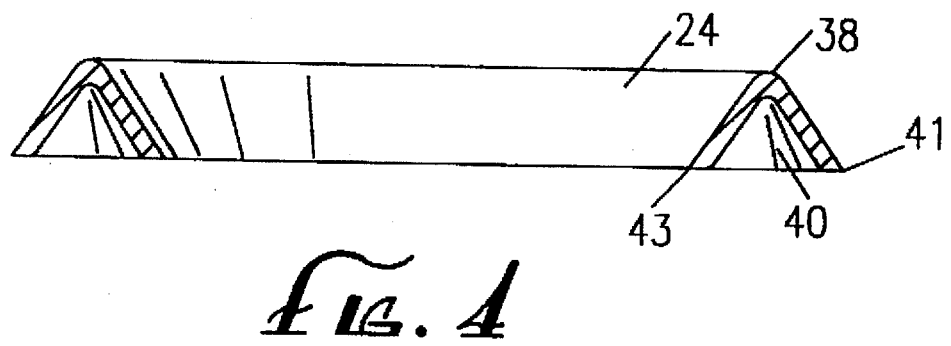
FIG. 4 is a cross-sectional view of a generally V-shaped ring taken along line 4—4 of FIG. 3.

The preferred embodiment of the valve packing assembly contained in the stuffing box is shown in an exploded format in FIG. 2. To seal the valve shaft, a compression member 20 is placed over the valve shaft and slid over the shaft into the stuffing box. The compression member, preferably a coiled spring with an aperture sized to receive the valve shaft, engages an upper wall 22 (FIG. 1) of the stuffing box. A set of three packing rings 24, 26, 28 is placed over the shaft and slid into the stuffing box up against the compression member. In the preferred embodiment shown, all three rings are generally V-shaped as shown in FIGS. 3 and 4. This V-shaped ring is commonly referred to as a chevron shaped ring. A cross-section of the V-shape is generally triangular with a central triangular opening 40 and a crown 38. The crown 38 of the packing rings may be more rounded than is shown, or flat, and the wall thickness can be varied. In the preferred embodiment the packing rings are made from graphite impregnated TEFLON®.

Referring back to FIG. 2, after the first set of three packing rings is pushed into the stuffing box, a conventional lantern ring 30 is placed over the shaft and pushed into the stuffing box. After the lantern ring, a second set of three packing rings 32, 34, 36 is placed over the shaft and pushed into the stuffing box. The crown 38 of the packing rings 28, 32 closest to the lantern ring are preferably oriented toward the lantern ring. The V-shape of the packing rings 28, 32 next to the lantern ring may be modified to have a flat crown, but if modified, it still includes the triangular opening 40.

Figure 5:
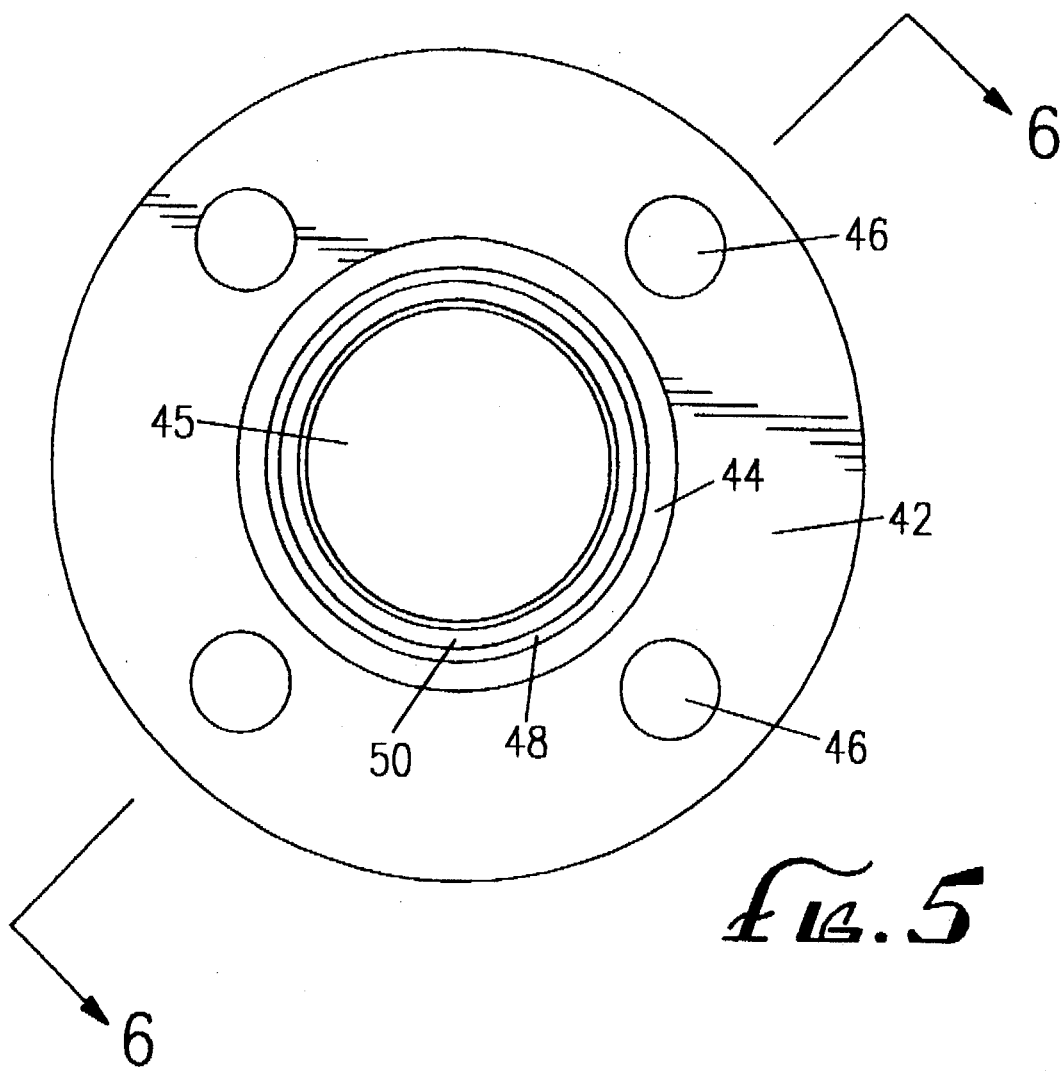
FIG. 5 is a top view of a packing gland used in the valve packing assembly which includes a sealing ring.
Figure 6:
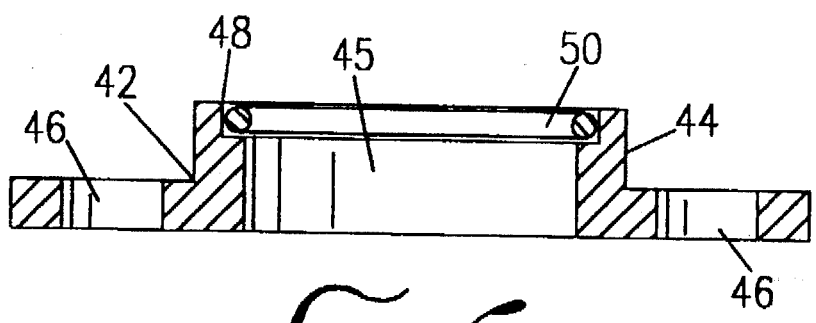
FIG. 6 is a cross-sectional view of the packing gland and sealing ring of FIG. 5 taken along line 6—6 of FIG. 5.

The contents of the stuffing box are held in place by a packing gland 42 shown in detail in FIGS. 5 and 6. The packing gland is attached to the valve where the valve shaft enters the stuffing box. The packing gland has a central aperture 45 sized to receive the valve shaft, and the packing gland has a flange 44 which extends into the stuffing box. The packing gland has four apertures 46 through which bolts are inserted to attach the packing gland to the valve. Further, the central aperture of the packing gland has a counterbore 48 to receive a sealing ring 50. During operation, portions of the valve shaft are translated in and out of the stuffing box. The sealing ring, which is preferably spring-loaded, seals against the valve shaft and the packing gland to prevent foreign matter from entering the stuffing box and damaging the valve packing. Thus, as the valve shaft is translated in a direction which brings externally exposed portions of the valve shaft into the stuffing box, any foreign matter on the valve shaft contacts the sealing ring, and the sealing ring prevents the foreign matter from entering the stuffing box.

When the packing gland is tightened onto the valve, the compression member is compressed, thereby compressing the V-shaped packing rings so that the crown of the packing rings is pushed toward the center of the packing rings and into the opening 40. The compression force expands the packing rings radially outward and inward to sealably engage the valve shaft and the vertical wall 52 of the stuffing box. Compression more readily expands the V-shaped packing rings, than packing rings with other shapes because the crown is readily forced into the triangular opening thereby forcing the outer edge 41 outwardly against the stuffing box wall and the inner edge 43 inwardly against the valve shaft. Because the V-shaped rings seal more efficiently and because there are two sets of packing rings, the frequency of leaks is reduced, thereby reducing the member of environmentally required valve packing repairs and eliminating environmental compliance problems.

The valve shaft 16 extends through the packing in the stuffing box out of the central aperture of the packing gland and extends up to a crosshead 54. The crosshead terminates at a body 56 which is split into two legs 58, 60. The two legs define a generally cylindrical shaft receiving area 58 therebetween. The valve shaft extends into a valve shaft receiving side of the crosshead approximately half way through the shaft receiving area to a point where a bore 60 through the valve shaft is aligned with a bore 62 through the body of the crosshead. A threaded valve shaft pin 64 extends through the bores 60, 62 and is engaged by a nut 66 which is tightened onto the valve shaft pin and held tight with a lock washer 68 or other mechanism such as a cotter pin to hold the valve shaft in place in the shaft receiving area. A stub shaft 70, which is much shorter than the valve shaft, is engaged by the actuator and extends into the body of the crosshead. When the stub shaft is inserted approximately half way into the stub shaft receiving side of the crosshead body, a bore 72 in the stub shaft is aligned with a bore 74 in the body of the crosshead. A threaded stub shaft pin 76 is inserted through the bores 72, 74 and secured therein by a nut 78 and lock washer 80 or other mechanism. Thus, the bifurcated shaft parts are held in an abutting relationship.

Once the valve shaft and stub shaft are held in place by the pins 64, 76, a tightening mechanism generally designated 82 is used to pinch the two legs of the crosshead together, thereby tightly securing the stub shaft and valve shaft in the shaft receiving area. The preferred embodiment of the tightening mechanism is simply a large threaded pin 82 which is inserted through bores 84 in the legs of the body and tightened with a nut 86. The nut is held tight with a lock washer or other mechanism preventing rotation of the nut relative to the pin such as a cotter pin.

The distance X between the bottom of the cabinet and the bottom of the valve is approximately 10 inches. Because of this small amount of available work space in the cabinet, it was previously necessary to dismantle the entire valve to repair and change the valve packing assembly. With the present invention, it is not necessary to disassemble the valves to repair the valve packing assembly. In a preferred embodiment of the present invention, the tightening mechanism is loosened, the stub shaft pin 76 is removed, and the stub shaft is removed from the assembly. Then the valve shaft pin is removed and the crosshead can be removed from the cabinet. Next, the packing gland is detached from the valve to open the stuffing box. The packing gland is slid off of the shaft and the sealing ring can be scraped out of the counterbore in the packing gland while the packing gland is at a work station. This is quicker and easier than scraping the sealing ring off the hard to reach stuffing box wall in the valve as previously required. The valve shaft can then be slid longitudinally in a direction out of the valve, so that the valve shaft is partially out of the valve a distance at least equal to the length of the stub shaft, thereby pulling all of the stuffing box contents out of the stuffing box. Therefore, the old valve packing is easily pulled off of the shaft; the shaft is cleaned; the replacement packing is placed back on the valve shaft and pushed back into the stuffing box; the packing gland is attached to the valve; the crosshead body is reattached to the valve shaft, and the stub shaft is reattached to the crosshead body. By removing the stub shaft, the limited work space in the cabinet is sufficient to allow the valve packing assembly to be changed without dismantling the valve. Utilizing this invention, packing changes are completed in approximately four (4) hours.

Thus, a valve packing replacement method and valve packing are disclosed which utilize V-shaped TEFLON® packing rings which are graphite impregnated to more efficiently seal the turbine fuel valve and a bifurcated shaft to more efficiently effect valve packing changes. While embodiments and applications of this invention have been shown and described, it would be apparent to those skilled in the art that many more modifications are possible without departing from the inventive concepts herein. It is, therefore, to be understood that the scope of the invention should be directed only by the appended claims, wherein what is claimed is:

What is claimed is:

1. A method of packing a valve to prevent leaks, the method comprising:

providing a stuffing box to seal a valve shaft of a turbine fuel valve, the valve shaft passing through the stuffing box;

sliding a compression member over the valve shaft and into the stuffing box against the top wall of the stuffing box;

sliding a first set of packing rings comprising at least one packing ring over the valve shaft, into the stuffing box, and against the compression member;

sliding a lantern ring over the valve shaft, into the stuffing box and against the first set of packing rings;

sliding a second set of packing rings comprising at least one packing ring over the valve shaft, into the stuffing box, and against the lantern ring;

sliding a packing gland over the valve shaft and against the second set of packing rings; and attaching the packing gland to the valve where the valve shaft enters the stuffing box;

compressing the first set of packing rings and the second set of packing rings so that the first and second sets of packing rings seal the valve shaft;

positioning a stub shaft to abut the valve shaft; and joining the valve shaft and the stub shaft in the abutting position with a crosshead.

2. A method of replacing a valve packing assembly of a stuffing box of a turbine fuel valve without dismantling the valve and in a manner which reduces leaks; the valve packing assembly being adapted to seal a valve shaft and having a compression member, a first set of packing rings, a lantern ring, and a second set of packing rings disposed on the valve shaft; the valve having a bifurcated shaft including the valve shaft and a stub shaft joined by a crosshead, a packing gland attached to the valve to compress the valve packing assembly; the method comprising:

disconnecting the stub shaft from the crosshead;

removing the stub shaft;

sliding the valve shaft connected to the crosshead and the value packing assembly disposed on the valve shaft in a direction out of the valve;

removing the valve packing assembly from the valve shaft;

replacing the valve packing assembly on the valve shaft;

sliding the valve shaft connected to the crosshead and the value packing assembly disposed thereon into the valve;

inserting the stub shaft; and connecting the stub shaft to the crosshead.

3. The method according to claim 2 further comprising:

detaching the packing gland having a sealing ring disposed in a counterbore of the packing gland from the valve; and attaching the packing gland to the valve after replacing the valve packing assembly.

4. The method according to claim 2 wherein the step of replacing the valve packing assembly on the valve shaft comprises sliding at least one generally V-shaped packing ring over the shaft.

5. The method according to claim 2 wherein the step of replacing the valve packing assembly on the valve shaft comprises sliding at least one TEFLON packing ring impregnated with graphite over the shaft.

6. The method according to claim 2 wherein the step of replacing the valve packing assembly on the valve shaft comprises:

sliding the first set of packing rings comprising at least one packing ring over the shaft; and sliding the second set of packing rings comprising at least one packing ring over the shaft.

7. The method according to claim 6 wherein the first set of packing rings and the second set of packing rings each comprise three packing rings.

8. A method of packing a turbine fuel valve to prevent leaks, the turbine fuel valve having an inlet opening, a wall spaced from the inlet opening, and a chamber between the inlet opening and the wall, the method comprising:

providing a stuffing box inside of the chamber to seal a valve shaft of the turbine fuel valve, the valve shaft extending through the stuffing box;

sliding a compression member over the valve shaft and into the stuffing box against a top wall of the stuffing box;

sliding at least one first packing ring over the valve shaft, into the stuffing box, and against the compression member;

sliding an intermediate ring over the valve shaft, into the stuffing box and against the first packing ring;

sliding at least one second packing ring over the valve shaft, into the stuffing box, and against the intermediate ring;

sliding a packing gland over the valve shaft and against the second packing ring; and attaching the packing gland to the wall of the valve external to the chamber; and compressing the first packing ring and the second packing ring so as to seal the valve shaft.

9. The method of claim 8, further comprising the steps of:

positioning a stub shaft to abut a portion of the valve shaft external to the chamber; and joining the valve shaft and the stub shaft in the abutting position.

* * * * *